United States Patent
Sun

(10) Patent No.: US 10,965,841 B2
(45) Date of Patent: Mar. 30, 2021

(54) RECEIVING DEVICE, VIDEO RECORDING SYSTEM AND METHOD FOR REDUCING VIDEO LATENCY IN VIDEO RECORDING SYSTEM

(71) Applicant: NOVATEK Microelectronics Corp., Hsinchu (TW)

(72) Inventor: Sheng-Nan Sun, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 16/923,112

(22) Filed: Jul. 8, 2020

(65) Prior Publication Data

US 2021/0014388 A1 Jan. 14, 2021

Related U.S. Application Data

(60) Provisional application No. 62/871,691, filed on Jul. 8, 2019.

(51) Int. Cl.
*H04N 5/12* (2006.01)
*H04N 5/919* (2006.01)
*H04N 5/956* (2006.01)

(52) U.S. Cl.
CPC ............. *H04N 5/123* (2013.01); *H04N 5/919* (2013.01); *H04N 5/956* (2013.01)

(58) Field of Classification Search
CPC ......... H04N 5/123; H04N 5/919; H04N 5/956
See application file for complete search history.

(56) References Cited

U.S. PATENT DOCUMENTS

| 2011/0018887 A1* | 1/2011 | Uchiyama | G09G 5/18 345/545 |
| 2012/0154678 A1* | 6/2012 | Chang | G06F 3/1454 348/500 |

* cited by examiner

*Primary Examiner* — Michael E Teitelbaum
(74) *Attorney, Agent, or Firm* — CKC & Partners Co., LLC

(57) ABSTRACT

A receiving device for reducing video latency includes a display render unit, a communication interface, a memory, and a processor. The display render unit performs a video transmission to output a video to a display apparatus. The video generated by a video capture unit of the sending device is transmitted through the communication interface to the receiving device. The memory stores at least one computer readable instruction. The processor accesses and executes the at least one computer readable instruction to: determine whether a video latency is necessary to be reduced; determine a target reduced latency based on a target line count and a current line count; and determine a first period based on the target reduced latency and an accelerating scheme at the display render unit. The display render unit performs the video transmission to the display apparatus based on the accelerating scheme for the first period.

20 Claims, 3 Drawing Sheets

RECEIVING DEVICE, VIDEO RECORDING SYSTEM AND METHOD FOR REDUCING VIDEO LATENCY IN VIDEO RECORDING SYSTEM

RELATED APPLICATIONS

This application claims priority to U.S. Provisional Application Ser. No. 62/871,691, filed Jul. 8, 2019, which is herein incorporated by reference in its entirety.

BACKGROUND OF THE INVENTION

Field of Invention

The present disclosure relates to a video recording system and a method for improving operation in the video recording system. More particularly, the present disclosure relates to a receiving device, a video recording system, and a method for reducing video latency in the video recording system.

Description of Related Art

E-mirrors are widely adopted in automobile industry to solve disadvantages of traditional rearview mirrors, so that drivers could see widely view and know road conditions during driving.

The view of the e-mirror is generated through capturing an image by a camera, and then processing and displaying the image on the e-mirrors by display render unit. There is usually a delay existed in the foregoing process, and such delay will affect the efficiency of the e-mirrors.

SUMMARY

The following presents a simplified summary of the disclosure in order to provide a basic understanding to the reader. This summary is not an extensive overview of the disclosure and it does not identify key/critical elements of the present disclosure or delineate the scope of the present disclosure.

One aspect of the present disclosure is directed to a receiving device for reducing video latency. The receiving device comprises a display render unit, a communication interface, a memory, and a processor. The display render unit is configured for performing a video transmission to output a video to a display apparatus connected to the receiving device. The communication interface is configured to connect a sending device. The video generated by a video capture unit of the sending device is transmitted through the communication interface to the receiving device. The memory is configured to store at least one computer readable instruction. The processor is electrically coupled to the memory, and configured to access and execute the at least one computer readable instruction to: during the video transmission performed by the display render unit to the display apparatus by using a pixel clock of a first frequency, determine whether a video latency, which is between frame data being ready at the video capture unit to frame data being output to the display apparatus at the display render unit, is necessary to be reduced; in response to determining that the video latency is necessary to be reduced, determine a target reduced latency based on a target line count and a current line count; and determine a first period based on the target reduced latency and an accelerating scheme at the display render unit. The display render unit is configured to, in response to that the first period is determined, perform the video transmission to the display apparatus based on the accelerating scheme for the first period.

Another aspect of the present disclosure is directed to a video recording system for reducing video latency. The video recording system comprises a sending device, a receiving device, a communication interface, a memory at the receiving device, and a processor at the receiving device. The sending device comprises a video capture unit for performing a video capturing operation to generate a video. The receiving device comprises a display render unit for performing a video transmission to output the video to a display apparatus connected to the video recording system. The communication interface is configured to connect the sending device and the receiving device. The video is transmitted through the communication interface to the receiving device. The memory at the receiving device is configured to store at least one computer readable instruction. The processor at the receiving device is electrically coupled to the memory, and configured to access and execute the at least one computer readable instruction to: during the video transmission performed by the display render unit to the display apparatus by using a pixel clock of a first frequency, determine whether a video latency, which is between frame data being ready at the video capture unit to frame data being output to the display apparatus at the display render unit, is necessary to be reduced; in response to determining that the video latency is necessary to be reduced, determine a target reduced latency based on a target line count and a current line count; and determine a first period based on the target reduced latency and a first accelerating scheme at the display render unit or a second accelerating scheme at the video capture unit. The display render unit is configured to, in response to that the first period is determined, perform the video transmission to the display apparatus based on the first accelerating scheme for the first period, or the video capture unit is configured to, in response to a request from the receiving device, perform the video capturing operation based on the second accelerating scheme for the first period.

Still another aspect of the present disclosure is directed to a method for reducing video latency in a video recording system. The video recording comprises a sending device and a receiving device, and the method is utilized in the receiving device. The method comprising: during a video transmission performed by the receiving device to a display apparatus by using a pixel clock of a first frequency, determining whether a video latency, which is between frame data being ready at the sending device to frame data being output to the display apparatus at the receiving device, is necessary to be reduced; in response to determining that the video latency is necessary to be reduced, determining a target reduced latency based on a target line count and a current line count; determining a first period based on the target reduced latency and a first accelerating scheme at the receiving device or a second accelerating scheme at the sending device; and performing the video transmission to the display apparatus for the first period based on a first accelerating scheme, or requesting the sending device to perform a video capturing operation for the first period based on a second accelerating scheme at the sending device.

In view of the above embodiments of the present disclosure, it is apparent that the application of the present invention has a number of advantages. In view of the foregoing, embodiments of the present disclosure provide a receiving device, a video recording system, and a method to perform the video transmission to the display apparatus based on the first accelerating scheme for the first period, or to perform the video capturing operation based on the second accelerating scheme for the first period. Since the video transmission or the video capturing operation is accelerated based on suitable accelerating scheme for suitable period, the frame period is reduced and the video latency in the video recording system is reduced accordingly.

These and other features, aspects, and advantages of the present disclosure, as well as the technical means and embodiments employed by the present disclosure, will become better understood with reference to the following description in connection with the accompanying drawings and appended claims.

BRIEF DESCRIPTION OF THE DRAWINGS

The disclosure can be more fully understood by reading the following detailed description of the embodiments, with reference made to the accompanying drawings as follows.

Figure 1:
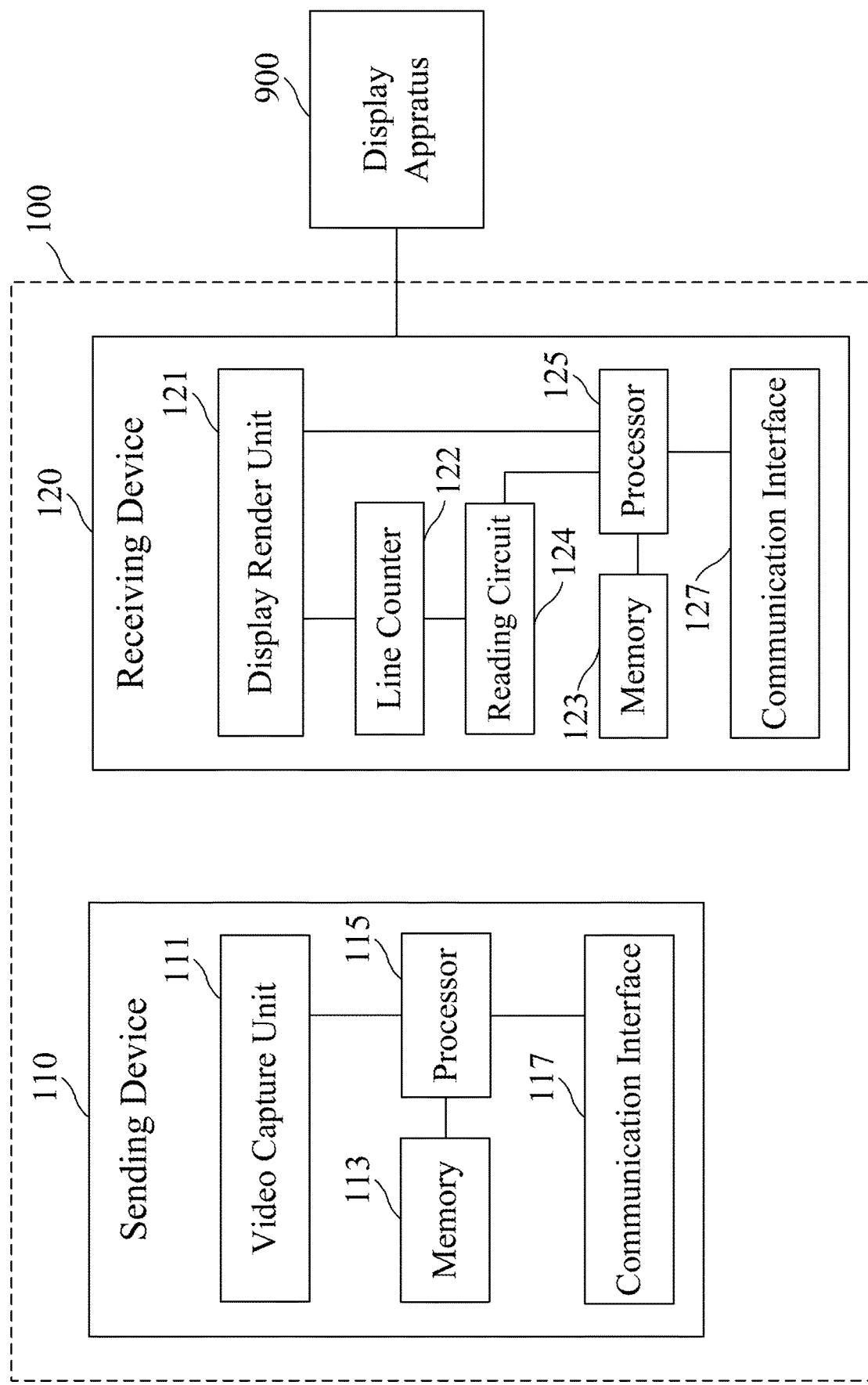
FIG. 1 is a schematic diagram of a video recording system for reducing video latency according to some embodiments of the present disclosure.

In accordance with common practice, the various described features/elements are not drawn to scale but instead are drawn to best illustrate specific features/elements relevant to the present disclosure. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include singular forms of the same.

FIG. 1 is a schematic diagram of a video recording system 100 for reducing video latency according to some embodiments of the present disclosure. As shown in the figure, the video recording system 100 includes a sending device 110 and a receiving device 120. In some embodiments, the sending device 110 includes a video capture unit 111, a memory 113, a processor 115, and a communication interface 117. The receiving device 120 includes a display render unit 121, a memory 123, a processor 125, and a communication interface 127.

With respect to connection, the communication interface 127 is configured to connect the sending device 110 through its communication interface 117 in a wired or wireless manner. For example, the communication interface 117 and the communication interface 127 adopt wired network (e.g., Ethernet IEEE 802.3) or wireless network (e.g., Wi-Fi IEEE 802.11. or Bluetooth). The receiving device 120 of the video recording system 100 is electrically connected to a display apparatus 900.

Reference is now made to the sending device 110. The video capture unit 111 is electrically connected to the processor 115. The processor 115 is electrically connected to the memory 113 and the communication interface 117. Referring to the receiving device 120, the display render unit 121 is electrically connected to the processor 125. The processor 125 is electrically connected to the memory 123 and the communication interface 127. The above discussion merely describes exemplary connections that can be made in accordance with various alternative embodiments. It is understood that such various alternative embodiments are not limited to the specific connections described above or those shown in FIG. 1.

In some embodiments, the sending device 110 can be an IP camera Soc. The receiving device 120 can be NVR (network video recorder) SoC, or car DVR (digital video recorder). However, the present disclosure is not intended to be limited to this embodiment. The embodiment provided herein is merely for illustration purpose.

With respect to operation, the video capture unit 111 of the sending device 110 is configured for performing a video capturing operation to generate a video. The video is transmitted through the communication interface 117 of the sending device 110 to the communication interface 127 of the receiving device 120. The display render unit 121 of the receiving device 120 is configured for performing a video transmission to output the video generated from the video capture unit 111 of the sending device 110 to the display apparatus 900. In addition, the memory 123 of the receiving device 120 is configured to store at least one computer readable instruction. The processor 125 of the receiving device 120 is configured to access and execute the at least one computer readable instruction to perform operations for reducing video latency, which will be described in detail in the following paragraphs.

Figure 2:
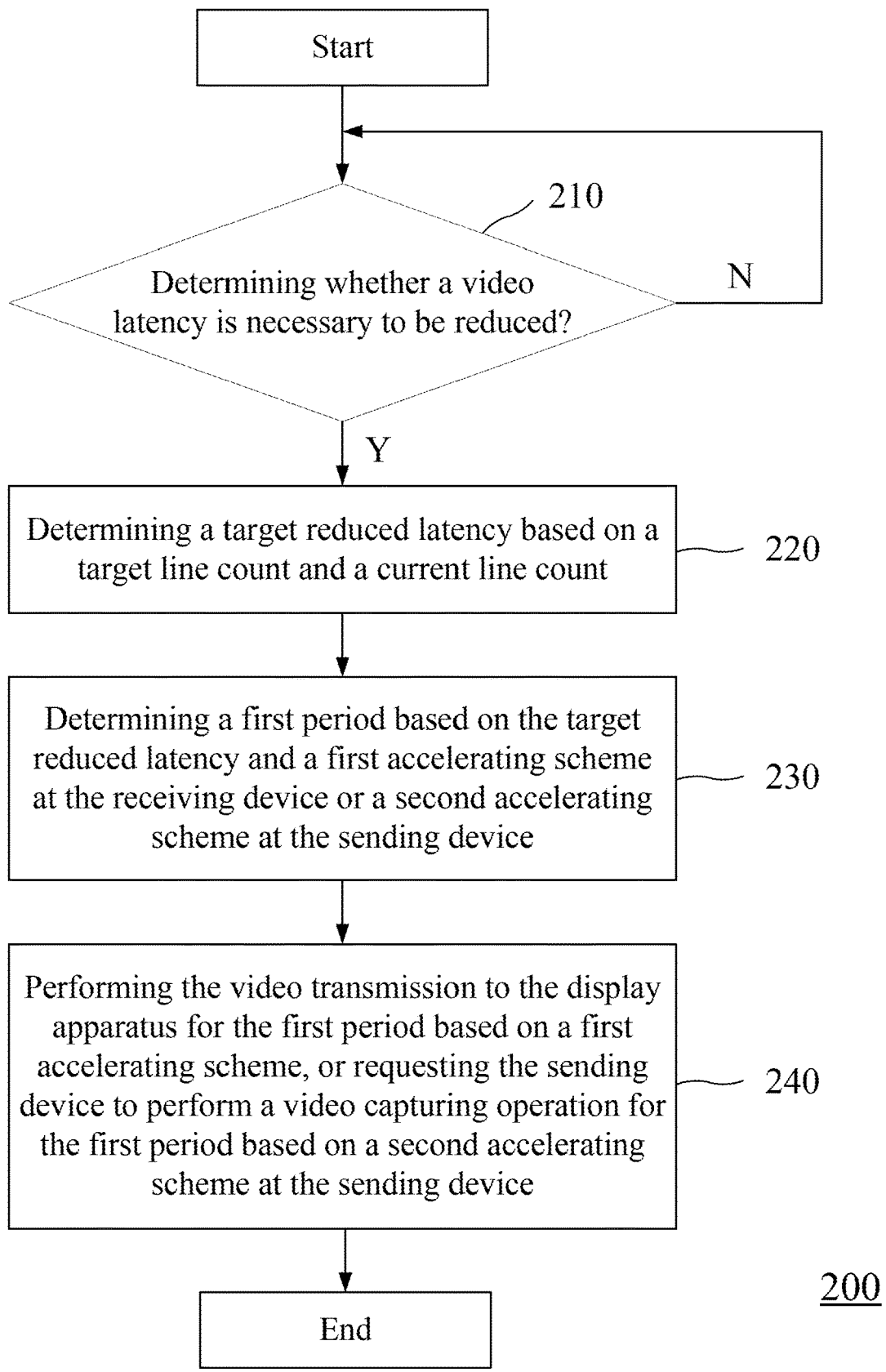
FIG. 2 is a flow chart of a method for reducing video latency in the video recording system in FIG. 1, in accordance with various embodiments of the present disclosure.

Reference is now made to FIG. 2. FIG. 2 is a flow chart of a method 200 for reducing video latency in the video recording system 100 in FIG. 1, in accordance with various embodiments of the present disclosure. For illustration, the operation of the video recording system 100 in FIG. 1 is described by the method 200.

With reference to the method 200 in FIG. 2, in operation 210, during the video transmission performed by the display render unit 121 to the display apparatus 900 by using a pixel clock of a first frequency, the processor 125 is configured to determine whether a video latency, which is between frame data being ready at the video capture unit 111 to frame data being output to the display apparatus 900 at the display render unit 121, is necessary to be reduced.

In some embodiments, the receiving device 120 in FIG. 1 further includes a line counter 122 and a reading circuit 124. The line counter 122 is electrically connected to the displaying render unit 121. The line counter 122 with respect to the display render unit 121 is configured for counting the number of lines in a current output frame those have been output to the display apparatus 900. The reading circuit 124 is electrically connected to the line counter 122, and configured to read the line counter 122 of the display render unit 121 to obtain a current line count. The determination of operation 210 in FIG. 2 can be performed by the processor 125 to compare the current line count and a threshold line count. If it is determined that the current line count is less than the threshold line count, operation 220 in FIG. 2 is executed.

For example, the current line count obtained by the reading circuit 124 from the line counter 122 is 25 lines, which is obtained when the sending device 110 generates a full image frame, and in other words, the display render unit 121 has output 25 lines of the n-th frame to the display apparatus 900 when the sending device 110 generates the (n+1)-th frame of the video. When the processor 125 compares and determines that the current line count (e.g., 25 lines) is less than the threshold line count (e.g., 400 lines), the processor 125 executes operation 220 in FIG. 2. However, the present disclosure is not intended to be limited to this embodiment. Other suitable value of the threshold line count can be adopted in the present disclosure according to actual requirements.

In some embodiments, if it is determined that the current line count is not less than the threshold line count, operation 210 in FIG. 2 is executed again after a halt time.

For facilitating the understanding of the method 200, various tables regarding parameters of the video recording system 100 are provided as shown below for illustration.

TABLE 1

| Screen refresh rate | 60 Hz |
|---|---|
| Vertical refresh | 31.46875 kHz |
| Pixel frequency | 25.175 MHz |

TABLE 2

| Scan line part | Pixels | Time(μs) |
|---|---|---|
| Visible area | 640 | 25.422 |
| Front porch | 16 | 0.63555 |
| Sync pulse | 96 | 3.8133 |
| Back porch | 48 | 1.9066 |
| Whole line | 800 | 31.777 |

TABLE 3

| Frame part | Lines | Time(ms) |
|---|---|---|
| Visible area | 480 | 15.252 |
| Front porch | 10 | 0.3177 |
| Sync pulse | 2 | 0.0635 |
| Back porch | 33 | 1.0486 |
| Whole frames | 525 | 16.68 |

In operation 220, in response to determining that the video latency is necessary to be reduced, the processor 125 is configured to determine a target reduced latency based on a target line count and a current line count.

In some embodiments, the target line count is predetermined to be 425 lines, and the current line count obtained by the reading circuit 124 from the line counter 122 is 25 lines. Referring to FIGS. 1-2, and table 2, the processor 125 determines the target reduced latency by the following formula:

$$\text{Target reduced latency}=(\text{target line count}-\text{current line count})*\text{line period} \quad (1)$$

Therefore, the target reduced latency=(425−25)*31.777 us=12.71 ms.

In operation 230, the processor 125 is configured to determine a first period based on the target reduced latency and a first accelerating scheme at the display render unit 121 or a second accelerating scheme at the video capture unit 111.

In operation 240, the display render unit 121 is configured to, in response to that the first period is determined, perform the video transmission to the display apparatus 900 based on the first accelerating scheme for the first period, or the video capture unit 111 is configured to, in response to a request from the receiving device, perform the video capturing operation based on the second accelerating scheme for the first period.

In some embodiments, one type of the first accelerating scheme is to accelerate the pixel clock of the display render unit 121 of the receiving device 120 from the first frequency to be a second frequency, and the first period is determined based on the target reduced latency and a reduced time per frame period determined by the acceleration of the pixel clock.

Figure 3:
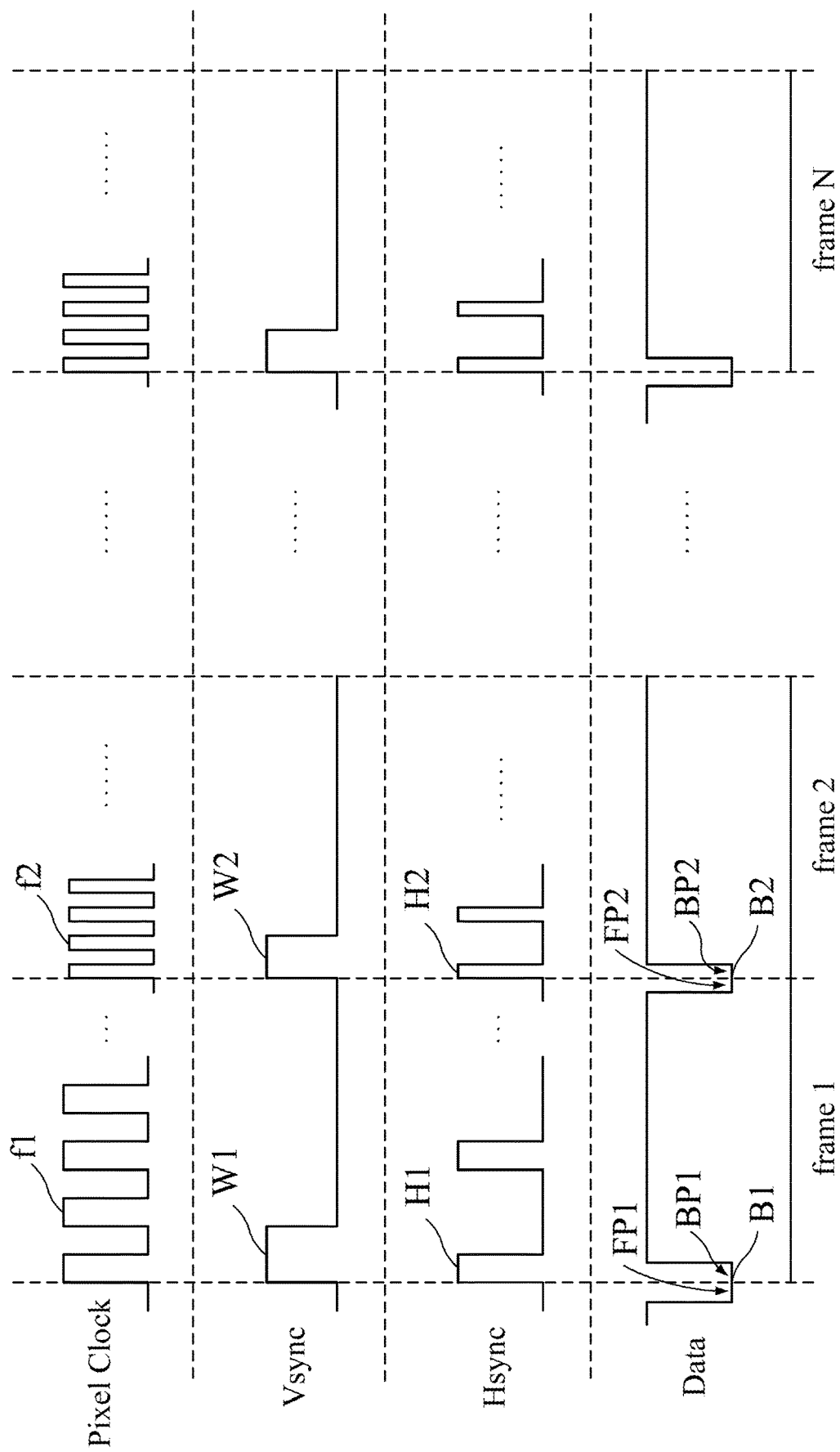
FIG. 3 is a waveform diagram of a video recording system for reducing video latency according to some embodiments of the present disclosure.

For facilitating the understanding of the accelerating scheme in the method 200, reference is made to FIG. 3, which is a waveform diagram of a video recording system 100 in FIG. 1 for reducing video latency according to some embodiments of the present disclosure.

As shown in FIG. 3, the first accelerating scheme is to accelerate the pixel clock of the display render unit 121 of the receiving device 120 from the first frequency f1 in frame 1 to be the second frequency f2 in frame 2. In this case, since the pixel clock of the display render unit 121 is accelerated, the frame period is reduced accordingly.

Substantially, the first period is determined based on the target reduced latency and a reduced time per frame period determined by the acceleration of the pixel clock. Referring to FIGS. 1-2, and table 1, based on an assumption that the first accelerating scheme is to accelerate the pixel clock of the display render unit 121 by 1%, and the accelerated pixel clock can be calculated by the following formula:

$$\text{Accelerated pixel clock}=(\text{original pixel clock})*1.01 \quad (2)$$

Therefore, the accelerated pixel clock=(25.175 MHz) *1.01=25.426 MHz.

Referring to FIGS. 1-2, and tables 2-3, the first period is determined by the following formulas:

$$\text{Adjusted frame period}=1/(\text{Accelerated pixel clock}) *800 \text{ pixel}*525 \text{ line} \quad (3)$$

$$\text{Reduced time per frame period}=\text{Original frame period}-\text{Adjusted frame period} \quad (4)$$

$$\text{First period}=\text{Target reduced latency}/\text{Reduced time per frame period} \quad (5)$$

As a result, the adjusted frame period=1/(25.426 MHz) *800*525=16.518 ms. Furthermore, the reduced time per frame period=16.68 ms−16.518 ms=0.162 ms. Finally, the first period=12.71 ms/0.162 ms÷76 frame periods. However, the present disclosure is not intended to be limited to this embodiment. In some cases, the reduced time per frame period can be determined firstly, and the rate of accelerated pixel clock of the display render unit 121 is calculated according to the reduced time per frame period. For example, as shown in formula (4), the reduced time per frame period is predetermined to be 0.162 ms firstly. Substantially, as shown in formulas (2), (3), the clock frequency (e.g., 1%) of the accelerated pixel clock can be inversely calculated according to the reduced time per frame period.

As described above, the first period is determined to be, for example, 76 frame periods if the first accelerating scheme is to accelerate the pixel clock of the display render unit 121 from the first frequency f1 to be the second frequency f2. In this case, the display render unit 121 is configured to perform the video transmission to the display apparatus 900 based on the first accelerating scheme for the first period (e.g., 76 frame periods).

In some embodiments, another type of the first accelerating scheme is to reduce a time length of a pulse of a vertical synchronization signal, which is a frame synchronization signal, of the display render unit 121 of the receiving device 120, and the first period is determined based on the target reduced latency and a reduced time per frame period determined by the reduced pulse of the vertical synchronization signal.

As shown in FIG. 3, the first accelerating scheme is to reduce the time length of the pulse of the vertical synchronization signal Vsync of the display render unit 121 of the receiving device 120 from the first pulse W1 in frame 1 to be the second pulse W2 in frame 2. In this case, since the time length of the pulse of the vertical synchronization signal Vsync of the display render unit 121 is reduced, the frame period is reduced accordingly.

Substantially, the first period is determined based on the target reduced latency and a reduced time per frame period determined by the reduced pulse of the vertical synchronization signal. Referring to FIGS. 1-2, and table 3, the time length of the pulse of the vertical synchronization signal Vsync is 0.0635 ms (i.e., 63.5 μs) that equals two line periods. If the pulse of the vertical synchronization signal Vsync is reduced to be 31.777 μs that equals one line period, the first period is determined by the following formula:

$$\text{First period=Target reduced latency/Reduced time of the pulse of Vsync} \quad (6)$$

Therefore, the first period=12.71 ms/31.777 μs÷400 frame periods. In this example, the reduced time of the pulse of Vsync equals the reduced time per frame period because vertical synchronization signal Vsync is the frame synchronization signal.

As described above, the first period is determined to be, for example, 400 frame periods if the first accelerating scheme is to reduce the time length of the pulse of the vertical synchronization signal Vsync of the display render unit 121 from the first pulse W1 to be the second pulse W2. In this case, the display render unit 121 is configured to perform the video transmission to the display apparatus 900 based on the first accelerating scheme for the first period (e.g., 400 frame periods).

In some embodiments, still another type of the first accelerating scheme is to reduce the time length of a pulse of a horizontal synchronization signal, which is a line synchronization signal, of the display render unit 121 of the receiving device 120, and the first period is determined based on the target reduced latency and a reduced time per frame period determined by the reduced pulse of the horizontal synchronization signal.

As shown in FIG. 3, the first accelerating scheme is to reduce the time length of the pulse of the horizontal synchronization signal Hsync of the display render unit 121 of the receiving device 120 from the first pulse H1 in frame 1 to be the second pulse H2 in frame 2. In this case, since the time length of the pulse of the horizontal synchronization signal Hsync of the display render unit 121 is reduced, the frame period is reduced accordingly.

Substantially, the first period is determined based on the target reduced latency and a reduced time per frame period determined by the reduced pulse of the horizontal synchronization signal Hsync.

As described above, the first period is determined based on the target reduced latency and a reduced time per frame period determined by the reduced pulse of the horizontal synchronization signal Hsync if the first accelerating scheme is to reduce the time length of the pulse of the horizontal synchronization signal Hsync of the display render unit 121 from the first pulse H1 to be the second pulse H2. In this case, the display render unit 121 is configured to perform the video transmission to the display apparatus 900 based on the first accelerating scheme for the first period.

In some embodiments, yet another type of the first accelerating scheme is to reduce a time length of a blanking period of a data signal of a display render unit 121 of the receiving device 120, and the first period is determined based on the target reduced latency and a reduced time per frame period determined by the reduced blanking period of the data signal.

As shown in FIG. 3, the first accelerating scheme is to reduce the time length of the blanking period of the data signal Data of the display render unit 121 of the receiving device 120 from the blanking period B1 in frame 1 to the blanking period B2 in frame 2.

In some embodiments, the blanking period (e.g., B1 or B2) includes a front porch (e.g., FP1 or FP2) and a back porch (e.g., BP1 or BP2). In some cases, the first accelerating scheme can be reducing the time length of the front porch of the output data signal Data (which compose output frames) from the front porch FP1 in frame 1 to the front porch FP2 in the frame 2, or reducing the time length of the back porch of the data signal Data from the back porch BP1 in frame 1 to the back porch BP2 in frame 2, depending on actual requirements.

Substantially, the first period is determined based on the target reduced latency and a reduced time per frame period determined by the reduced blanking period of the output data signal Data.

As described above, the first period is determined based on the target reduced latency and a reduced time per frame period determined by the reduced blanking period of the output data signal Data if the first accelerating scheme is to reduce the time length of the blanking period of the output data signal Data of the display render unit 121 from the blanking period B1 to the blanking period B2. In this case, the display render unit 121 is configured to perform the video transmission to the display apparatus 900 based on the first accelerating scheme for the first period.

In some embodiments, the second accelerating scheme is to accelerate an input clock of the sending device 110 for generating an image frame from a third frequency to be a fourth frequency. In this case, since the input clock of the sending device 110 is accelerated, the frame period is reduced accordingly.

Substantially, the first period is determined based on the target reduced latency and a reduced time per frame period determined by the acceleration of the input clock of the sending device 110.

As described above, the first period is determined based on the target reduced latency and a reduced time per frame period determined by the acceleration of the input clock of the sending device 110 if the second accelerating scheme is to accelerate the input clock of the sending device 110 for generating the image frame from the third frequency to be the fourth frequency. In this case, the video capture unit 111 is configured to, in response to a request from the receiving device 120, perform the video capturing operation based on the second accelerating scheme for the first period.

In some embodiments, the processor 125 is configured to access and execute the at least one computer readable instruction stored in the memory 123 to calculate an actual latency based on a number of lines of a visible area of a frame and the current line count.

Referring to FIGS. 1-2, and table 3, the actual latency is calculated by the following formula:

$$\text{Actual latency} = (\text{lines of visible area} - \text{current line count}) * \text{line period} \quad (7)$$

Therefore, the actual reduced latency=(480-25)*31.777 us=14.46 ms.

In view of the above embodiments of the present disclosure, it is apparent that the application of the present invention has a number of advantages. In view of the foregoing, embodiments of the present disclosure provide the video recording system 100 and the method 200 to perform the video transmission to the display apparatus based on the first accelerating scheme for the first period, or to perform the video capturing operation based on the second accelerating scheme for the first period. Since the video transmission or the video capturing operation is accelerated based on suitable accelerating scheme for suitable period, the frame period is reduced and the video latency in the video recording system 100 is reduced accordingly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A receiving device for reducing video latency, comprising:
   a display render unit for performing a video transmission to output a video to a display apparatus connected to the receiving device;
   a communication interface configured to connect a sending device, wherein the video generated by a video capture unit of the sending device is transmitted through the communication interface to the receiving device;
   a memory configured to store at least one computer readable instruction; and
   a processor electrically coupled to the memory, and configured to access and execute the at least one computer readable instruction to:
   during the video transmission performed by the display render unit to the display apparatus by using a pixel clock of a first frequency, determine whether a video latency, which is between frame data being ready at the video capture unit to frame data being output to the display apparatus at the display render unit, is necessary to be reduced;
   in response to determining that the video latency is necessary to be reduced, determine a target reduced latency based on a target line count and a current line count; and
   determine a first period based on the target reduced latency and an accelerating scheme at the display render unit;
   wherein the display render unit is configured to, in response to that the first period is determined, perform the video transmission to the display apparatus based on the accelerating scheme for the first period.

2. The receiving device of claim 1, further comprising:
   a line counter with respect to the display render unit, for counting the number of lines in a current output frame those have been output to the display apparatus; and
   a reading circuit configured to read the line counter of the display render unit to obtain a current line count; and
   wherein the at least one computer readable instruction to determine whether the video latency is necessary to be reduced comprises a computer readable instruction to compare the current line count and a threshold line count.

3. The receiving device of claim 1, wherein the accelerating scheme is to accelerate a pixel clock of the display render unit of the receiving device from the first frequency to be a second frequency, and the first period is determined based on the target reduced latency and a reduced time per frame period determined by the acceleration of the pixel clock.

4. The receiving device of claim 1, wherein the accelerating scheme is to reduce a time length of a pulse of a synchronization signal of the display render unit of the receiving device, and the first period is determined based on the target reduced latency and a reduced time per frame period determined by the reduced pulse of the synchronization signal, wherein the synchronization signal is a frame synchronization signal or a line synchronization signal.

5. The receiving device of claim 1, wherein the accelerating scheme is to reduce a time length of a blanking period of a data signal of the display render unit of the receiving device, and the first period is determined based on the target reduced latency and a reduced time per frame period determined by the reduced blanking period of the data signal.

6. The receiving device of claim 1, wherein the processor is configured to access and execute the at least one computer readable instruction to:
   calculate an actual latency based on the number of lines of a visible area of a frame and the current line count.

7. A video recording system for reducing video latency, comprising:
   a sending device, comprising a video capture unit for performing a video capturing operation to generate a video;
   a receiving device, comprising a display render unit for performing a video transmission to output the video to a display apparatus connected to the video recording system;
   a communication interface configured to connect the sending device and the receiving device, wherein the video is transmitted through the communication interface to the receiving device;
   a memory at the receiving device, configured to store at least one computer readable instruction; and
   a processor at the receiving device, electrically coupled to the memory, and configured to access and execute the at least one computer readable instruction to:
   during the video transmission performed by the display render unit to the display apparatus by using a pixel clock of a first frequency, determine whether a video latency, which is between frame data being ready at the video capture unit to frame data being output to the display apparatus at the display render unit, is necessary to be reduced;

in response to determining that the video latency is necessary to be reduced, determine a target reduced latency based on a target line count and a current line count; and determine a first period based on the target reduced latency and a first accelerating scheme at the display render unit or a second accelerating scheme at the video capture unit;

wherein the display render unit is configured to, in response to that the first period is determined, perform the video transmission to the display apparatus based on the first accelerating scheme for the first period, or the video capture unit is configured to, in response to a request from the receiving device, perform the video capturing operation based on the second accelerating scheme for the first period.

8. The video recording system of claim 7, wherein the receiving device further comprises:

a line counter with respect to the display render unit, for counting the number of lines in a current output frame those have been output to the display apparatus; and a reading circuit configured to read the line counter of the display render unit to obtain a current line count; and wherein the at least one computer readable instruction to determine whether the video latency is necessary to be reduced comprises a computer readable instruction to compare the current line count and a threshold line count.

9. The video recording system of claim 7, wherein the first accelerating scheme is to accelerate a pixel clock of the display render unit of the receiving device from the first frequency to be a second frequency, and the first period is determined based on the target reduced latency and a reduced time per frame period determined by the acceleration of the pixel clock.

10. The video recording system of claim 7, wherein the first accelerating scheme is to reduce a time length of a pulse of a synchronization signal of the display render unit of the receiving device, and the first period is determined based on the target reduced latency and a reduced time per frame period determined by the reduced pulse of the synchronization signal, wherein the synchronization signal is a frame synchronization signal or a line synchronization signal.

11. The video recording system of claim 7, wherein the first accelerating scheme is to reduce a time length of a blanking period of a data signal of the display render unit of the receiving device, and the first period is determined based on the target reduced latency and a reduced time per frame period determined by the reduced blanking period of the data signal.

12. The video recording system of claim 7, wherein the second accelerating scheme is to accelerate an input clock of the sending device for generating an image frame from a third frequency to be a fourth frequency, and the first period is determined based on the target reduced latency and a reduced time per frame period determined by the acceleration of the input clock of the sending device.

13. The video recording system of claim 7, wherein the processor is configured to access and execute the at least one computer readable instruction to:

calculate an actual latency based on a number of lines of a visible area of a frame and the current line count.

14. A method for reducing video latency in a video recording system, the video recording system comprising a sending device and a receiving device and the method being utilized in the receiving device, the method comprising:

during a video transmission performed by the receiving device to a display apparatus by using a pixel clock of a first frequency, determining whether a video latency, which is between frame data being ready at the sending device to frame data being output to the display apparatus at the receiving device, is necessary to be reduced;

in response to determining that the video latency is necessary to be reduced, determining a target reduced latency based on a target line count and a current line count;

determining a first period based on the target reduced latency and a first accelerating scheme at the receiving device or a second accelerating scheme at the sending device; and performing the video transmission to the display apparatus for the first period based on the first accelerating scheme, or requesting the sending device to perform a video capturing operation for the first period based on the second accelerating scheme.

15. The method of claim 14, wherein determining whether the video latency is necessary to be reduced comprises:

reading a line counter of the receiving device to obtain a current line count, which indicates the number of lines in a current output frame those have been output from a display render unit of the receiving device to the display apparatus; and determining whether the video latency is necessary to be reduced by comparing the current line count and a threshold line count.

16. The method of claim 14, wherein the first accelerating scheme is to accelerate a pixel clock of a display render unit of the receiving device from the first frequency to be a second frequency, and the first period is determined based on the target reduced latency and a reduced time per frame period determined by the acceleration of the pixel clock.

17. The method of claim 14, wherein the first accelerating scheme is to reduce a time length of a pulse of a synchronization signal of a display render unit of the receiving device, and the first period is determined based on the target reduced latency and a reduced time per frame period determined by the reduced pulse of the synchronization signal, wherein the synchronization signal is a frame synchronization signal or a line synchronization signal.

18. The method of claim 14, wherein the first accelerating scheme is to reduce a time length of a blanking period of a data signal of a display render unit of the receiving device, and the first period is determined based on the target reduced latency and a reduced time per frame period determined by the reduced blanking period of the data signal.

19. The method of claim 14, wherein the second accelerating scheme is to accelerate an input clock of the sending device for generating an image frame from a third frequency to be a fourth frequency, and the first period is determined based on the target reduced latency and a reduced time per frame period determined by the acceleration of the input clock of the sending device.

20. The method of claim 14, further comprising calculating an actual latency based on the number of lines of a visible area of a frame and the current line count.

* * * * *